Figures 1, 2:
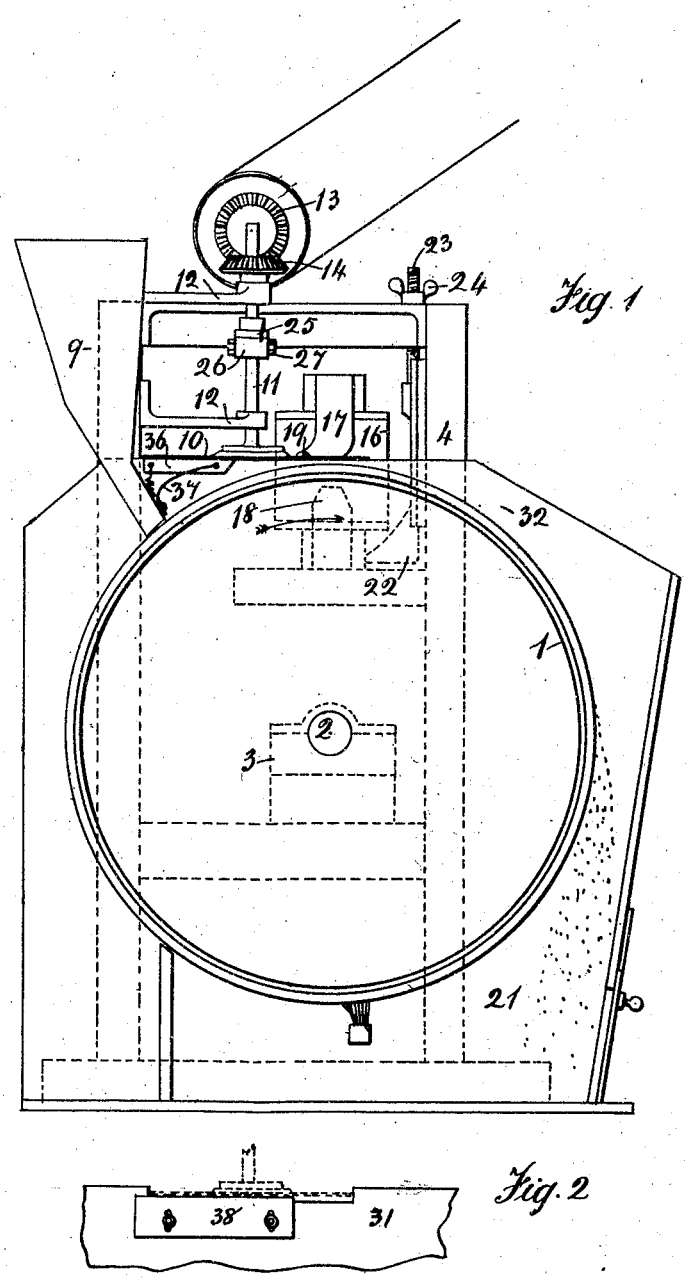

No. 780,870. PATENTED JAN. 24, 1905.
J. T. DAWES.
MAGNETIC SEPARATOR FOR ORES OR SIMILAR MATERIALS.
APPLICATION FILED DEC. 28, 1903.

2 SHEETS—SHEET 1.

Witnesses
W. B. Johnson
H. Lightfoot

Inventor
John Thomas Dawes

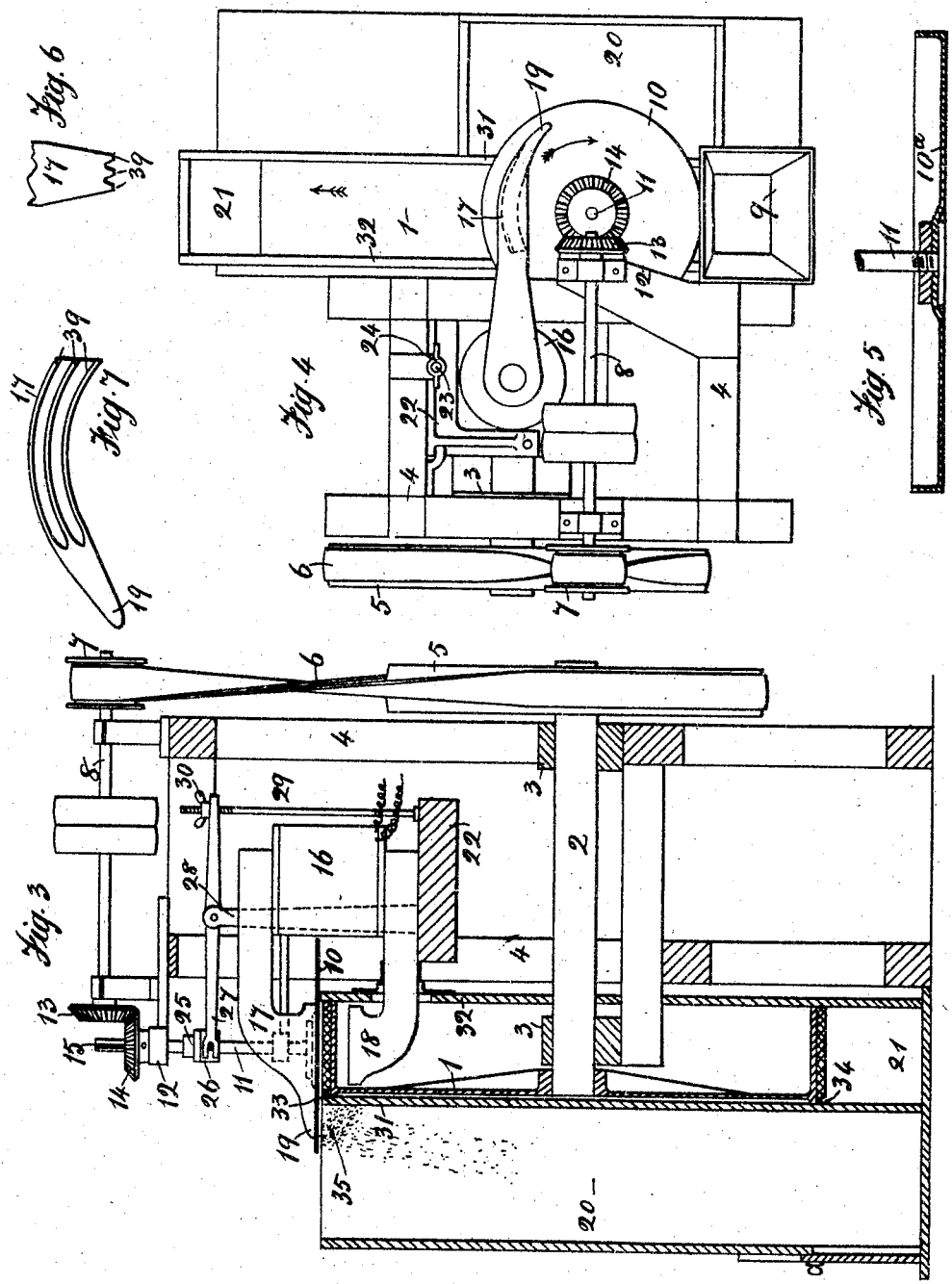

No. 780,870. Patented January 24, 1905.

UNITED STATES PATENT OFFICE.

JOHN THOMAS DAWES, OF LIVERPOOL, ENGLAND.

MAGNETIC SEPARATOR FOR ORES OR SIMILAR MATERIALS.

SPECIFICATION forming part of Letters Patent No. 780,870, dated January 24, 1905.

Application filed December 28, 1903. Serial No. 186,799.

*To all whom it may concern:*

Be it known that I, JOHN THOMAS DAWES, a subject of the King of Great Britain, residing at Liverpool, in the county of Lancaster, England, have invented new and useful Improvements in Magnetic Separators for Ores or Similar Materials, of which the following is a specification.

The invention relates to machines in which the powdered ore or other granular material is fed in a layer upon a moving surface and the magnetizable particles attracted toward a magnet-pole above; and the objects are to provide simple appliances for more effectively separating the magnetizable particles and carrying them away from the non-magnetizable particles. I attain these objects by appliances substantially as illustrated on the accompanying drawings, whereon—

Figure 1 is a side view of a machine for the above purposes, having the outer shield and hopper removed. Fig. 2 is a detail view of the upper part of the outer shield. Fig. 3 is a central transverse section, and Fig. 4 is a plan of the same. Fig. 5 is a detail section of a modification of disk to an enlarged scale. Figs. 6 and 7 are detail end view and underneath plan, respectively, of the upper polepiece.

In this machine the moving surface for carrying the material to be separated consists of a drum 1, preferably of non-magnetic material, secured on a shaft 2, carried in bearings 3, supported on the main frame 4.

5 is a pulley on the shaft 2.

6 is a belt from the pulley 7 on the first motion-shaft 8 to the pulley 5 for rotating the drum 1 in the direction of the arrow.

9 is a hopper for feeding the material onto the drum in a thin layer. Any suitable form of feed appliances may be used. The material is carried forward beneath a disk 10, the lower face of which is arranged a short distance above the upper portion of the periphery of the drum and approximately tangential, as shown, to the face of the drum. The disk 10 is secured on a shaft 11, rotating in bearings 12, secured to the frame 4, and is rotated from the shaft 8 by bevel-wheels 13 14. The shaft 11 has a keyway at 15, and the wheel 14 is provided with a key fitting into the keyway, so that the shaft 11 may move axially through the wheel 14 to allow of adjusting the disk 10, as hereinafter described.

16 is an electromagnet having one pole, 17, arranged above and close to the disk 10 and the other pole, 18, arranged within the drum at a short distance from the inner face, so that an intense magnetic field is produced, into which the material is carried by the drum. As the material passes along the magnetizable particles are attracted more strongly by the upper pole and fly up against the under surface of the disk, which by its rotation carries them out to the end 19 of the pole 17, whence they fall into the hopper or receptacle 20. The non-magnetic particles of the material are carried forward by the drum and fall into the hopper or receptacle 21. The magnet 16 is mounted on a slide 22, which by means of a screw 23 and wing-nut 24 or other convenient adjusting devices can be moved up or down to vary the distance of the magnet-poles from the periphery of the drum as desired.

25 is a collar secured on the shaft 11 and resting on a loose collar or bearing 26, carried in a forked lever 27, which is pivoted on a pillar 28, supported by the slide 22. The other end of the lever 27 is secured by a screw 29 and wing-nut 30 or other adjusting device to allow of adjusting the disk 10 to any desired distance from the pole 17, and by means of the nut 24 the disk and magnet are moved up or down simultaneously.

31 is a shield at the outer side of the drum. 32 is a shield at the inner side of the drum. Both shields are close to the drum to prevent any material falling off the sides, and preferably at the top of the drum a part 33 of the shield 31 projects inwardly in a recess 34 in the drum, but not above the surface of the drum, so as to more effectually prevent the particles carried by the disk from coming again in contact with the drum. The remaining parts of the shields may be higher than the periphery of the drum, space being left for the rotation of the disk 10. When there are a large proportion of magnetizable particles in the material, they are liable to collect in a bunch under the disk 10 about the outer extremity of the pole 17, and to prevent such bunch coming in contact with the drum and the particles being detached and carried into the hopper 21 by friction I extend the end of the pole 17 outward at 19 nearly to the periphery of the disk, and the particles collect at 35 between the extremity of the pole 18 and the extension 19 on the shield, the upper part of which and the inward projection 33 are interposed between the extremity of the pole 19 and the drum and keep the particles of the bunch entirely out of contact with the drum. As the disk 10 rotates and brings more particles to the end of the pole the particles gradually fall down into the hopper 20. Any particles adhering to the disk are removed by a scraper 36, carried on springs 37, and fall again onto the drum 1. The shield 31 may have a slide 38 (see Fig. 2) adjustable up or down, so that its top is always nearly touching the disk 10, so as to prevent as much as possible any magnetizable particles being flung round again onto the drum 1.

Referring to Fig. 5, this shows a form of disk 10ª having an upturned rim to prevent any magnetic particles being attracted round the edge of the disk and adhering to the magnet-pole.

Referring to Figs. 6 and 7, that part of the face of the pole-piece 17 directly above the drum 1 may be curved approximately to a radius from the axis of the disk 10 and may be formed with projections 39 approximately parallel with the line of travel of the disk to concentrate the magnetic force into several lines.

I claim—

1. In a magnetic separator the combination of a moving conveyer for receiving the material a second moving conveyer above the first moving conveyer, a magnet-pole above the second moving conveyer, and a shield disposed under the second moving conveyer between the outer extremity of the magnet-pole and the first moving conveyer and parallel to and in contact with the side of the first moving conveyer, part of the top of the shield under the magnet-pole being level with the first moving conveyer, substantially as described.

2. In a magnetic separator the combination of a moving conveyer for receiving the material, a second moving conveyer above the first moving conveyer, a magnet-pole above the second moving conveyer such magnet-pole having a portion thereof extending above the second moving conveyer beyond the first moving conveyer and a shield disposed under the second moving conveyer between the extended portion of the magnet-pole and the first moving conveyer and parallel to and in contact with the side of the first moving conveyer part of the top of the shield under the magnet-pole being level with the first moving conveyer, substantially as described.

3. In a magnetic separator the combination of a moving conveyer for receiving the material, a second moving conveyer above the first moving conveyer a magnet-pole above the second moving conveyer, a magnet-pole of opposite polarity under the first moving conveyer, and a shield disposed under the second moving conveyer between the outer extremity of the magnet-pole and the first moving conveyer and parallel to and in contact with the side of the first moving conveyer, part of the top of the shield under the magnet-pole being level with the first moving conveyer, substantially as described.

4. In a magnetic separator the combination of a moving conveyer for receiving the material, a second moving conveyer above the first moving conveyer, a magnet-pole above the second moving conveyer such magnet-pole having a portion thereof extending above the second moving conveyer beyond the first moving conveyer a magnet-pole of opposite polarity under the first moving conveyer and a shield disposed under the second moving conveyer between the extended portion of the magnet-pole and the first moving conveyer and parallel to and in contact with the side of the first moving conveyer, part of the top of the shield under the magnet-pole being level with the first moving conveyer, substantially as described.

5. In a magnetic separator the combination of a moving conveyer for receiving the material, a recess at the edge of the conveyer a second moving conveyer above the first moving conveyer a magnet-pole above the first moving conveyer, a shield parallel to the side of the first moving conveyer, and a projection from the shield fitting into the recess in the first moving conveyer the top of the projection being level with the first moving conveyer, substantially as described.

6. In a magnetic separator the combination of a moving conveyer for receiving the material, a second moving conveyer above the first moving conveyer and a magnet-pole above the second moving conveyer, a movable carrier for the magnet-pole mechanism for adjusting the magnet-pole and second moving conveyer toward the first moving conveyer, and mechanism supported on the movable carrier for independently adjusting the second moving conveyer toward the magnet-pole, substantially as described.

7. In combination in a magnetic separator a moving conveyer for receiving the material a rotating disk against which magnetizable particles are attracted by a magnet, a shield at the side of the first moving conveyer and in contact therewith and an adjustable scraper at the upper part of the shield in contact with the under side of the disk substantially as described.

In testimony whereof I have signed my name to this specification in the presence of two subscribing witnesses.

JOHN THOMAS DAWES.

Witnesses:
W. B. JOHNSON,
H. LIGHTFOOT.